US008597467B2

(12) United States Patent
Jehn-Rendu et al.

(10) Patent No.: US 8,597,467 B2
(45) Date of Patent: Dec. 3, 2013

(54) WATER-SOLUBLE POST BRANCHED CATIONIC ACRYLAMIDE POLYMERS AND USE THEREOF

(75) Inventors: Christian Jehn-Rendu, Eppelheim (DE); Rene Hund, Villars (FR); Muttalif Duong, Saint Chamond (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 610 days.

(21) Appl. No.: 12/665,805

(22) PCT Filed: Jul. 11, 2008

(86) PCT No.: PCT/FR2008/051310
§ 371 (c)(1),
(2), (4) Date: Dec. 21, 2009

(87) PCT Pub. No.: WO2009/013423
PCT Pub. Date: Jan. 29, 2009

(65) Prior Publication Data
US 2010/0186914 A1   Jul. 29, 2010

(30) Foreign Application Priority Data
Jul. 18, 2007   (FR) ..................... 07 05181

(51) Int. Cl.
*D21H 11/00*   (2006.01)
(52) U.S. Cl.
USPC ............. 162/164.6; 162/158; 162/168.3
(58) Field of Classification Search
USPC ................ 162/164.6, 168.3, 158
See application file for complete search history.

(56) References Cited

U.S. PATENT DOCUMENTS

| 3,250,665 A | 5/1966 | Gess |
| 4,479,879 A * | 10/1984 | Hashimoto et al. ........... 210/727 |
| 6,255,400 B1 * | 7/2001 | Itoh et al. ...................... 525/242 |
| 2004/0139559 A1 | 7/2004 | Detering et al. |
| 2006/0142431 A1 * | 6/2006 | Sutman et al. ................. 524/13 |
| 2008/0196851 A1 * | 8/2008 | Hund et al. ................ 162/164.6 |

FOREIGN PATENT DOCUMENTS

| FR | 1437807 A | 5/1966 |
| JP | 2009301398 A | 10/2003 |
| WO | WO 98/18831 A | 5/1998 |
| WO | WO 2006/075115 A | 7/2006 |
| WO | WO 2006075115 A2 * | 7/2006 |

OTHER PUBLICATIONS

International Search Report for PCT/FR2008/051310, dated Dec. 23, 2008.

* cited by examiner

*Primary Examiner* — Jacob Thomas Minskey
(74) *Attorney, Agent, or Firm* — Heslin Rothenberg Farley & Mesiti P.C.

(57) ABSTRACT

A cationic copolymer is obtained by the Hofmann rearrangement (also referred to as the Hofmann degradation reaction) in aqueous solution in the presence of an alkaline-earth and/or alkali hydroxide and an alkaline-earth and/or alkaline hypohalide, on a base copolymer comprising at least one nonionic monomer selected from the group comprising acrylamide (and/or methacrylamide), N,N-dimethylacrylamide and/or acrylonitrile The copolymer is branched after the Hofmann rearrangement, in the presence of at least one polyfunctional branching agent, and is soluble in water.

15 Claims, No Drawings

WATER-SOLUBLE POST BRANCHED CATIONIC ACRYLAMIDE POLYMERS AND USE THEREOF

CROSS REFERENCE TO RELATED APPLICATIONS

This application is a national stage filing under section 371 of International Application No. PCT/FR2008/051310 filed on Jul. 11, 2008, and published in French on Jan. 29, 2009 as WO 2009/013423 and claims priority of French application No. 0705181 filed on Jul. 18, 2007, the entire disclosure of these applications being hereby incorporated herein by reference.

BACKGROUND ART

The invention relates to cationic polymers derived from acrylamide obtained by the Hofmann rearrangement, also called the Hofmann degradation reaction. It also relates to the use of these polymers, essentially as dry strength agents jointly developing drainage and retention properties in a papermaking process.

Increasingly strong papers and cardboards are needed, in particular for the packaging industry.

By definition, the dry strength of the paper is the strength of the normally dry sheet. The bursting and tensile strength values conventionally give an estimate of the dry strength of the paper.

The use of water-soluble cationic polymers to improve the strength of paper is well known. Due to their nature, they can be fixed directly to the anionic cellulose and give it a cationic charge so that in combination with anionic polymers, the latter are fixed to the cellulose fibres, thereby improving the dry strength of the sheet.

The cationic acrylamide polymers known in the prior art are of various types: they are usually copolymers based on acrylamide and cationic monomers. They may also be Mannich polymers (the acrylamide polymer reacts with formaldehyde and a secondary amine and is then quaternized), glyoxalated polymers or acrylamide polymers on which a Hofmann rearrangement has been carried out.

Among all these polymers, only those obtained by the Hofmann rearrangement have specific and unique properties in terms of cationic charge density.

Until recently, only very large scale processes using, in situ, a production unit at very low concentrations of about 1% of Hofmann degradation product (EP 377313) or processes using another polymer (base of the N-vinylformamide copolymer type followed by hydrolysis) itself relatively costly (US 2004/118540), had been installed.

Only when the patents WO 2006075115 and FR 07 53347 to the Applicant appeared in early 2005 and 2007, did the production of Hofmann degradation products become industrially feasible, by proposing to use Hofmann degradation products in concentrations higher than 1%, about 3.5%, or even higher.

The action of the cationic acrylamide polymer obtained by the Hofmann rearrangement on the dry strength (tensile, bursting, internal cohesion, etc.) of the sheet depends, to varying degrees, on the quantity employed. In practice, the quantity of Hofmann degradation product introduced into the cellulose suspension is generally much higher than that of a conventional retention agent, about 800 to 1500 grams of active polymer per metric ton of dry pulp.

Whereas dry strength agents are known in the prior art to require a high dosage, no economically viable agent is yet known which, when used, optimally performs the functions both of dry strength agent and those of retention agent of fillers and fibrous materials and of dehydration accelerator, when sheets are formed without a significant development of the permanent wet strength properties.

Japanese patent application JP 61-44902 also teaches that it is possible, by reaction with polyfunctional compounds such as dihalide compounds, in predefined quantitative proportions, to crosslink polymers comprising primary amine functions in order to prepare water-insoluble resins to make them sequestering agents. A similar approach is proposed in document FR 1 437 807 to crosslink gelatine which is then treated to make it insoluble in water.

Document WO 98/18831 discloses a crosslinkable latex of which the potential crosslinking is carried out in two steps. In a first step, the polymer is partially degraded by the Hofmann rearrangement. This causes the conversion of part of the amide functions to amine functions. These functions then react together to create intra- and inter-chain bonds, that is, a process of self crosslinkage. The crosslinking is then reinforced by adding a crosslinking agent. The crosslinked polymers obtained are insoluble in water (see example 3).

The problem that the invention proposes to solve is hence to develop novel cationic polymers which have significantly better performance in terms of drainage and/or flocculation compared to the cationic acrylamide polymers of the prior art while preserving its dry strength agent properties.

BRIEF SUMMARY OF INVENTION

The Applicant has discovered and developed novel water-soluble products having the desired properties as previously identified for the paper industry, the said products being produced by reacting a polyfunctional agent with a cationic acrylamide polymer, which is itself obtained by Hofmann rearrangement. More precisely, the Applicant has demonstrated that the branching of a polymer obtained by the Hofmann rearrangement, which is itself previously branched or not, serves to improve drainage and flocculation performance.

In other words, the invention relates to a cationic copolymer obtained by the Hofmann rearrangement (also referred to as the Hofmann degradation reaction) in aqueous solution in the presence of an alkaline-earth and/or alkali hydroxide and an alkaline-earth and/or alkali hypohalide, on a base copolymer comprising at least one nonionic monomer selected from the group comprising acrylamide (and/or methacrylamide), N,N-dimethylacrylamide and/or acrylonitrile. This cationic copolymer is characterized in that it is branched after the Hofmann rearrangement, in the presence of at least one polyfunctional branching agent, and is soluble in water.

In the context of the present invention, polyfunctional agent means any agent having a plurality of groups (two or more) which can react with the pending primary amine functions resulting from the Hofmann rearrangement on the base polymer.

As already stated, the branched character must be distinguished from the crosslinked character of the polymers of the prior art, in particular those described in documents FR 1 437 807 and WO 98/18831, which are insoluble in water.

Advantageously, the polyfunctional branching agent is selected from the group comprising:
polyisocyanates: hexamethylene diisocyanate,
polyhalides: 1,2-dichloroethane, 1,3-dichloropropane, 1,4-dichlorobutane and 1,6-dichlorohexane, polyepoxides: polyethylene glycol diepoxides, ethylene glycol diglycidyl ether (EGDE), polyethylene glycol triepoxide (PEGT sold by EMS under the trade name GRILBOND G1701), alkylepoxy halides: epichlorohydrin, bischlorohydrin ethers of alkylene glycols and polyalkylene glycol, alkylene carbonates: ethylene carbonate, propylene carbonate and bischloroformates: 2,2-dimethylpropylene bischloroformate Preferably, a water-soluble polyfunctional branching agent selected from the group comprising polyepoxides and alkylepoxy halides is used alone or in a mixture.

The post-reaction kinetics is contingent on four main criteria:

These are:

the ratio of branching agent to Hofmann degradation product: it is preferable to use less than 2% by weight of polyfunctional agent with regard to the weight of cationic polymer, in general between 500 and 15000 ppm, the reaction temperature: this is a function of the reactivity of the branching agent, generally between 30 and 60° C., the initial concentration of the Hofmann degradation product, and the time during which the reaction is conducted.

As shown below, even if the essential characteristic of the polymer of the invention resides in that it is branched after the Hofmann reaction, this does not prevent the said polymer from also being branched before the Hofmann rearrangement. This branching is carried out on the base polymer during or after polymerization and hence before the Hofmann rearrangement.

According to another feature, the polymers of the invention have an intrinsic viscosity higher than 0.6, preferably higher than 0.8, or even higher than 1 dl/g.

According to another feature, they are obtained by the Hofmann rearrangement, in a concentration higher than 6%, preferably higher than 8% before optional dilution.

The polymers as defined below are preferable as Hofmann degradation products. However, it is also possible to consider that the post-reaction can be carried out on other types of polymer having a very similar chemical structure, that is, comprising primary amine functions.

The Branched Cationic Acrylamide Copolymer

This is obtained by:

Hofmann rearrangement on a base copolymer

Followed by a post-reaction using at least one polyfunctional branching agent.

The "Base" Copolymer

In practice, the base polymer used consists of:

at least one nonionic monomer selected from the group comprising acrylamide (and/or methacrylamide), N,N-dimethylacrylamide and/or acrylonitrile preferably acrylamide, advantageously at least 5 mol % of the said monomer, and optionally but preferably, at least one unsaturated cationic ethylenic monomer preferably selected from the group comprising monomers of the dialkylaminoalkyl methacrylamide, diallylamine, dialkyldiallylamine type and their quaternary ammonium salts or acids and/or a nonionic monomer selected from the group comprising N-vinyl acetamide, N-vinyl formamide, N-vinylpyrrolidone and/or vinyl acetate.

Among the unsaturated cationic ethylenic monomers, mention can be made in particular of dimethyldiallylammonium chloride (DADMAC), acrylamidopropyltrimethylammonium chloride (APTAC) and/or methacrylamido propyl trimethylammonium chloride (MAPTAC).

Optionally, the base polymer may also comprise anionic charges carried by monomers of the acid or anhydride type such as, for example, methacrylic acid, acrylamido methylpropane sulphonic acid, itaconic acid, maleic anhydride, maleic acid, methallylsulphonic acid, vinylsulphonic acid and salts thereof.

It is important to note that in combination with these monomers, it is also possible to use monomers insoluble in water, such as acrylic, allyl or vinyl monomers comprising a hydrophobic group. During their use, these monomers are employed in very small quantities, lower than 20 mol %, preferably lower than 10 mol %, and they are selected preferably from the group comprising derivatives of acrylamide such as N-alkylacrylamide for example, N-tert-butylacrylamide, octylacrylamide and also N,N-dialkylacrylamides such as N,N-dihexylacrylamide, and derivatives of acrylic acid such as alkyl acrylates and methacrylates.

In a manner known per se, the base copolymer may also be branched, as already stated.

The branching of the base copolymer can be carried out preferably during (or optionally after) the polymerization, in the presence of a branching agent and optionally a transfer agent. The following is a non-limiting list of branching agents: methylene bisacrylamide (MBA), ethylene glycol diacrylate, polyethylene glycol dimethacrylate, diacrylamide, cyanomethylacrylate, vinyloxyethylacrylate or methacrylate, polyallyl compounds (e.g. triallylamine, etc.), formaldehyde, glyoxal, compounds of the glycidylether type such as ethyleneglycol diglycidylether, or epoxies or any other means well known to a person skilled in the art of crosslinking.

In practice, the branching agent is methylene bisacrylamide (MBA) introduced at the rate of five to fifty thousand (5 to 50000) parts per million by weight, preferably 5 to 1000. Advantageously, the branching agent is selected from methylene bisacrylamide (MBA) or polyallyl compounds.

A non-limiting list of transfer agents is provided below: isopropyl alcohol, sodium hypophosphite, mercaptoethanol, etc.

A person skilled in the art will know how to select the best combination according to his own knowledge and the present description, and also the examples that follow.

The copolymer serving as a basis for the Hofmann rearrangement does not require the development of a particular polymerization process. The main polymerization techniques, well known to a person skilled in the art and feasible are: precipitation polymerization, emulsion polymerization (aqueous or reverse) followed or not by a distillation and/or spray drying step, and suspension polymerization or solution polymerization, these two techniques being preferred.

This base is characterized in that it has a molecular weight that is advantageously higher than 5000 and without an upper limit, the only limiting factor being, for obvious limitations of use, the viscosity of the polymer solution which is a function of the copolymer concentration and its molecular weight.

It is also possible to add to the base copolymer solution, before or during the Hofmann rearrangement, certain additives which are capable of reacting on the isocyanate functions of the polymer generated during the degradation. In general, these are molecules carrying nucleophilic chemical functions such as hydroxyl, amine functions, etc. By way of example, the additives in question may therefore be of the family of: alcohols, polyols (e.g. starch), polyamines, polyethylene imines, etc.

In the context of the present invention, it is also possible to propose cationic acrylamide copolymers obtained by the Hofmann rearrangement in the form of a mixture with one or more other synthetic polymers having a higher molecular weight and preferably a nonionic or cationic charge.

Copolymers prepared in a uniform aqueous or essentially aqueous solution are preferred.

Hofmann rearrangement on a base copolymer

Followed by a post-reaction using at least one polyfunctional branching agent.

The "Base" Copolymer

In practice, the base polymer used consists of:
- at least one nonionic monomer selected from the group comprising acrylamide (and/or methacrylamide), N,N-dimethylacrylamide and/or acrylonitrile preferably acrylamide, advantageously at least 5 mol % of the said monomer, and optionally but preferably, at least one unsaturated cationic ethylenic monomer preferably selected from the group comprising monomers of the dialkylaminoalkyl methacrylamide, diallylamine, dialkyldiallylamine type and their quaternary ammonium salts or acids and/or a nonionic monomer selected from the group comprising N-vinyl acetamide, N-vinyl formamide, N-vinylpyrrolidone and/or vinyl acetate.

Using a solution of base copolymer having a concentration of between 10 and 40% by weight, preferably between 20 and 40% by weight, the molar quantity of total methacrylamide function is determined. The desired level of alpha degradation is then selected (corresponding to the degree of amine function desired), which serves to determine the dry quantity of alkaline-earth and/or alkali hypohalide and then the beta coefficient, which serves to determine the dry quantity of alkaline-earth and/or alkali hydroxide.

A solution of alkaline-earth and/or alkali hypohalide and alkaline-earth and/or alkali hydroxide is then prepared from the alpha and beta ratios. Conventionally, the reactants used are sodium hypochlorite and caustic soda (sodium hydroxide).

In order to stabilize the amine functions that are produced, it is optionally possible to add, to the reactor containing the base copolymer, one (or optionally more) quaternary ammonium derivatives as described in patent JP 57077398 and well known to a person skilled in the art, who thereby intends to prevent the reaction between the amine functions and the residual amide functions.

The addition of these agents can be carried out separately, or simultaneously, in a mixture or not, in any order of introduction, and at one or more injection points.

It is important to note that owing to the highly aggressive physicochemical conditions required to carry out the Hofmann rearrangement, they inevitably lead to a levelling of the polymeric chain links, which results in a very pronounced drop in the intrinsic viscosity of the polymers after degradation, independently of the molecular weight of the starting base copolymer.

Advantageously, the polymer of the invention has a cationic charge density higher than 3 meq/g, preferably higher than 5 meq/g.

The Post-Branching Reaction Using at Least One Polyfunctional Agent

The post-reaction kinetics depends on 4 main criteria:

These are:
- the ratio of branching agent to Hofmann degradation product: preferably less than 2% by weight of branching agent is used with regard to the polymer, generally between 500 and 15000 ppm,
- the reaction temperature: this depends on the reactivity of the branching agent, for information generally between 30 and 60° C.,
- the initial concentration of the Hofmann degradation product,
- the time during which the reaction is conducted.

A person skilled in the art knows how to select the best combination according to his own knowledge and the present description, and also the examples that follow.

The reaction can be carried out either in batch or using a continuous process and mixing the solution of the Hofmann degradation product with the branching agent in respective proportions, in an appropriate device and by then heating the mixture to the desired reaction temperature. It should be observed that the polyfunctional agent can be introduced in one or more additions, or even continuously.

When the desired apparent viscosity of the reaction mixture is reached, the rapid lowering of the pH using acid (e.g. hydrochloric acid) then serves to stop the reaction.

The products prepared using the inventive method have a strong unexpected effect as retention agents for fillers and fibres, as dehydration accelerators and as flocculants, but without necessarily affecting their performance in terms of dry strength.

Accordingly, the invention also relates to a method for fabricating a sheet of paper and/or cardboard and similar, whereby, before the formation of the said sheet, at least one dry strength agent consisting of the polymer of the invention is added to the fibrous suspension.

In practice, the dry strength agent is introduced into the suspension at the rate of 500 g/to 2 kg per metric ton of pulp, advantageously between 800 g and 1.5 kg per metric ton.

In an improved embodiment, at least two dry strength agents are added to the fibrous suspension, separately or in a mixture, in any order of introduction, at one or more injection points, respectively:
- a first agent corresponding to the copolymer of the present invention,
- a second agent corresponding to a copolymer having an anionic charge density higher than 0.1 meq/g.

In practice, the second anionic agent is a water-soluble organic polymer having an anionic charge density higher than 0.1 meq/g, characterized in that it is obtained from:
- 1 to 100 mol % of at least one monomer having an anionic charge,
- and 0 to 99 mol % of at least one monomer having a neutral and/or cationic charge.

The following is a non-limiting list of monomers which can be used:

a) anionic monomers having a carboxylic function (e.g. acrylic acid, methacrylic acid and salts thereof), having a sulphonic acid function (e.g. 2-acrylamido-2-methylpropane sulphonic acid (AMPS), vinylsulphonic acid, methallylsulphonic acid and salts thereof);

b) nonionic monomers: acrylamide, methacrylamide, N,N-dimethylacrylamide, N-vinyl pyrrolidone, N-vinyl acetamide, N-vinyl formamide, vinylacetate, acrylate esters, allyl alcohol and/or cationic monomers: mention can be made in particular and in a non-limiting manner of dimethylaminoethyl acrylate (ADAME) and/or dimethylaminoethyl methacrylate (MADAME), optionally quarternized or salified, dimethyldiallylammonium chloride (DADMAC), acrylamidopropyltrimethylammonium chloride (APTAC) and/or methacrylamido propyl trimethylammonium chloride (MAPTAC).

The anionic resin does not require the development of the particular polymerization process. It can be obtained by all polymerization techniques well known to a person skilled in the art: gel polymerization, precipitation polymerization, emulsion polymerization (aqueous or reverse) followed or not by a distillation and/or spray drying step, and suspension polymerization or solution polymerization.

According to a particular and preferred embodiment, the copolymer having an anionic charge density higher than 0.1 meq/g is branched. It is obtained by the addition, before, during and/or after the polymerization, of a branching agent in the presence or not of a transfer agent. When the branching agent is glyoxal, it is added after the polymerization.

A non-limiting list of branching agents: methylene bisacrylamide (MBA), ethylene glycol diacrylate, polyethylene glycol dimethacrylate, diacrylamide, cyanomethylacrylate, vinyloxyethylacrylate or methacrylate, polyallyl compounds (e.g. triallylamine, etc.), formaldehyde, glyoxal, compounds of the glycidylether type such as ethyleneglycol diglycidylether, or epoxies or any other means well known to a person skilled in the art for crosslinking.

A non-limiting list of transfer agents is as follows: isopropyl alcohol, sodium hypophosphite, mercaptoethanol, etc.

In practice, the second dry strength agent is introduced, quite preferably, into the suspension at the rate of 100 g/t to 20000 g/t by weight of active material (polymer) with regard to the dry weight of the fibrous suspension, preferably 500 g/t to 5000 g/t.

DETAILED DESCRIPTION

The following examples illustrate the invention but without limiting its scope.

EXAMPLES

Water-Soluble Branched Cationic Acrylamide Copolymers (C+)

The product was obtained by a Hofmann rearrangement of an acrylamide copolymer and dimethyldiallylammonium chloride (DADMAC) at a temperature of 10° C. using sodium hypochlorite, sodium hydroxide and hydrochloric acid (used as reactants according to the method described above) (in which the base copolymer is optionally pre-branched) followed by distillation. The base polymers were polymerized in aqueous solution in a concentration of 25% or having the same viscosity (3000 cps). Remark: In base 2 (pre-branched), 2000 ppm (with regard to the active material), of TAA (branching agent) were added to the initial (monomer) feed before polymerization.

| Products | IV (dl/g) | Charge density | Concentration | Chemistry |
|---|---|---|---|---|
| base 1 | 0.86 | 3.6 | 25% | AM/DADMAC |
| base 2 (pre-branched) | 1.45 | 3.6 | 25% | AM/DADMAC/ TAA |
| Ce1 | 0.43 | 8.5 | 9% | Hofmann base1 |
| Ce2 | 0.58 | 8.5 | 9% | Hofmann base2 |
| P1a (patent) | 0.99 | 8.4 | 8.5% | Hofmann base1 Post-branched with PEGT |
| P1b (patent) | 1.05 | 8.5 | 8.5% | Hofmann base 1 Post-branched with EPI |
| P2 (patent) | 1.2 | 8.6 | 8.5% | Hofmann base2 Post-branched with diepoxy |

Concentration (in weight %)
Charge density (meq/g of polymer)

The measurements of intrinsic viscosity were taken by the method as defined in standard ISO 1628/1—October 1988 "Guidelines for the standardization of methods for determining the viscosity index and the limit viscosity index of polymers in dilute solution".

AM/DADMAC=acrylamide copolymer/DADMAC (70/30 mol %)
TAA=triallylamine
EPI=epichlorohydrin
PEGT=polyethylene glycol triepoxide
Ce: counter-examples Remark: The operating conditions in terms of sodium hypochlorite, sodium hydroxide and hydrochloric acid were adapted and optimized so that all the amide functions carried by the polymer are degraded by the Hofmann reaction to amine functions. However, depending on the required cationicity, the Alpha may be reduced to values lower than 0.8 or even lower than 0.5.

Owing to their specificity associated with their high cationic charge density, the polymers of the invention are particularly advantageous for the paper industry. This is why it was decided to test their properties in terms of effectiveness for such applications. However, their use can also be considered for all similar applications requiring these types of characteristics.

Procedure for Testing Polymer Properties: Retention and Drainage Performance

The Test:

The various tests were carried out in a "Britt Jar" container and with a slurry consisting of a mixture of:
- 70% of hardwood kraft
- 10% of softwood kraft
- 20% of mechanical pulp
- 20% of natural calcium carbonate
- sizing in neutral medium with 2% of an emulsion of alkyl ketene dimer.

The pulp is diluted to 0.3% to carry out the drainage test and 0.5% to carry out the retention test.

Britt Jar Sequence at 1000 Rpm (Revolutions Per Minute):
T=0 s: stirring of 500 ml of pulp
T=10 s: addition of polymer
T=30 s: opening of the Britt Jar, recovery of 100 ml of white water. The total retention is calculated by the following formulas FPR %=$(C_{HB}-C_{WW})/C_{HB}$ and FPAR %=$(C_{AHB}-C_{AWW})/C_{AWW}$.

Where:
$C_{HB}$=consistency in head box
$C_{WW}$=consistency in white water
$C_{AHB}$=consistency of ash in headbox
$C_{AWW}$=consistency of ash in white water
% FPAR: ash retention first pass in percentage
% FPR: retention first pass in percentage (total retention)

TABLE 1

| Polymer | Cationic dosage (%) | FPR (%) | FPAR (%) |
|---|---|---|---|
| White | 0 | 72.5 | 3.7 |
| Ce1 | 0.08 | 77.5 | 23.4 |
| P1a | 0.08 | 79.1 | 29.8 |
| P1b | 0.08 | 77.8 | 24.5 |
| Ce2 | 0.08 | 78.1 | 25.1 |
| P2 | 0.08 | 80.1 | 32.9 |
| Ce1 | 0.15 | 78.8 | 28.3 |
| P1a | 0.15 | 81.4 | 38.9 |
| P1b | 0.15 | 80.2 | 33.4 |
| Ce2 | 0.15 | 78.9 | 29.2 |
| P2 | 0.15 | 82.0 | 39.2 |

CSF Sequence at 1000 Rpm (Revolutions Per Minute):
Use of a static sheet machine to stir the pulp. Introduction of 1 liter of 0.3% pulp.
T=0 s: stirring of pulp
T=10 s: addition of polymer
T=30 s: stopping of stirring and recovery of the liter of pulp.
Performance of TAPPI T 2270M-94 test.

TABLE 2

| Polymer | Cationic dosage (%) | % improvement CSF |
|---|---|---|
| White | 0 | 0 |
| Ce1 | 0.08 | 14.3 |
| P1a | 0.08 | 32.3 |
| P1b | 0.08 | 29.7 |
| Ce2 | 0.08 | 16.3 |
| P2 | 0.08 | 41.2 |
| Ce1 | 0.15 | 20.1 |
| P1a | 0.15 | 43.5 |
| P1b | 0.15 | 41.2 |
| Ce2 | 0.15 | 22.4 |
| P2 | 0.15 | 56.1 |

CSF: Measurement of the degree of drainability of the pulp

Comments on Results:

The results demonstrate the essential role played by the post-branching reaction. Used as the main retention agent, the polymers of the invention comprehensively and significantly improve the effectiveness of the papermaking process, in terms of retention and drainage. It is found in particular that the percentage improvement in drainage is multiplied by a factor of 2, which on the industrial scale has the result of allowing a significant acceleration of the machine and hence of its productivity.

II/Procedure for Testing Polymer Properties: Performance in DSR Application (Dry Strength), Basis Weight 60 g/m2

It is important to note that it is known that the increase in the charge retention and drainage values generally affects the physical properties of the paper such as the strength properties.

The Test:

Paper handsheets are prepared using an automatic dynamic machine. The pulp is first prepared by disintegrating 90 grams of virgin kraft fibres in 2 liters of hot water for 30 minutes. The slurry obtained is then diluted to a total volume of 9 liters. Once the consistency is accurately measured, the quantity of this pulp required is taken to obtain a final sheet with a basis weight of 60 g/m2.

The pulp is then introduced into the chest of the dynamic sheet machine, diluted to a consistency of 0.32% and moderately stirred with a mechanical stirrer in order to homogenize the fibrous suspension.

In manual mode, the pulp is pumped to the nozzle in order to prime the circuit.

A blotter and the forming fabric are placed in the bowl of the dynamic sheet machine before starting the rotation of the bowl at 900 m/min and constructing the waterwall. The various dry strength agents are then introduced into the fibre suspension stirred with a contact time of 30 seconds for each polymer. The sheet is then prepared (in automatic mode) by 22 return trips of the nozzle spraying the pulp into the waterwall. Once the water is drained and the automatic sequence is terminated, the forming fabric with the network of fibres formed is removed from the chest of the dynamic sheet machine and placed on the table. A dry blotter is placed on the side of the pad of wet fibres and is pressed once with a roller. The whole is turned over and the fabric delicately separated from the fibrous pad. A second dry blotter is placed on the sheet (between the two blotters) and pressed once by a press delivering 4 bar and is then dried on a stretch dryer for 9 min at 107° C. The two blotters are then removed and the sheet stored overnight in a room with controlled humidity and temperature (50% relative humidity and 23° C.). The dry and wet strength properties of all the sheets obtained by this procedure are then evaluated.

The burst index is measured using a Messmer Buchel M 405 burstmeter (mean of 14 measurements).

The dry tensile strength and/or the tensile energy absorbed (TEA) are measured in the machine direction with a Testometric AX tensile test apparatus (mean of 5 samples).

The wet tensile strength is measured in the machine direction with a Testometric AX tensile test apparatus after the sample has been dipped for 20 seconds in a Finch cell filled with deionized water (mean of 5 samples).

In all the examples below, and unless otherwise indicated, the sheets of paper are prepared by the above procedure, by first introducing the cationic dry strength agent (the Hofmann degradation product) in a dose of 1.5 kg/T (dry polymer/dry fibre) and then the anionic resin in a dose of 1.5 kg/T (dry polymer/dry fibre).

The tests are performed with a pulp at neutral pH.

The Anionic Resin (A−):

The anionic resin used in the test is an acrylamide and sodium acrylate copolymer (70/30 mol %) obtained by 15% solution polymerization and having a bulk viscosity of 2500 cps.

TABLE 1

Effect of post-branching after Hofmann rearrangement

| Table 3 C+ alone | Dosage C+ (%) | % increase in dry tensile strength | % increase in wet tensile strength | % increase in burst index |
|---|---|---|---|---|
| White | 0 | 0 | 0 | 0 |
| P1a | 0.15 | 19 | 0 | 21.2 |
| P1b | 0.15 | 19.5 | 0 | 22.1 |
| P2 | 0.15 | 19 | 0 | 21.7 |

TABLE 4

| C+ and A− | Dosage C+ (%) | Dosage A− (%) | % increase in dry tensile strength | % increase in wet tensile strength | % increase in burst index |
|---|---|---|---|---|---|
| White | 0 | 0 | 0 | 0 | 0 |
| P1a | 0.15 | 0.15 | 30.3 | 24 | 46.5 |
| P1b | 0.15 | 0.15 | 30.3 | 21 | 46.2 |
| P2 | 0.15 | 0.15 | 31 | 22 | 47.1 |
| P2 | 0.08 | 0.08 | 20.1 | 0 | 21.3 |

TABLE 5

| alum, C+ and A− | Dosage alum (%) | Dosage C+ (%) | Dosage A− (%) | % increase in dry tensile strength | % increase in wet tensile strength | % increase in burst index |
|---|---|---|---|---|---|---|
| White | 0 | 0 | 0 | 0 | 0 | 0 |
| P1a | 0.25 | 0.15 | 0.15 | 37.2 | 22 | 48.2 |
| P1b | 0.25 | 0.15 | 0.15 | 36.1 | 21 | 47.2 |
| P2 | 0.25 | 0.15 | 0.15 | 37.4 | 22 | 48.4 |

Comments on Results:

These results clearly show that the dry strength properties are not affected by the modifications of the invention. As previously observed (cf. WO 2006075115), the Hofmann degradation products do not produce a permanent wet strength.

It is also found that the polymers of the invention have the best performance in the presence of an anionic resin and alum.

It may also be observed that in a dose of 0.15%, the product of the invention serves to impart both:
mechanical properties to the sheet (cf. Tables 3, 4 and 5), and retention and drainage properties (cf. Tables 1 and 2).
In this respect, the branched cationic acrylamide polymer of the invention is similar to a two-in-one polymer.

The invention claimed is:

1. A process for preparing a water-soluble cationic copolymer said process comprising the sequential steps of
    (a) reacting a base copolymer comprising at least one nonionic monomer selected from the group consisting of acrylamide methacrylamide, N,N-dimethylacrylamide and acrylonitrile in aqueous solution in the presence of an alkaline-earth and/or alkali hydroxide and an alkaline-earth and/or alkali hypohalide, and
    (b) reacting with at least one polyfunctional branching agent.

2. A process according to claim 1, wherein the polyfunctional branching agent is selected from the group consisting of:
    polyisocyanates: hexamethylene diisocyanate,
    polyhalides: 1,2-dichloroethane, 1,3-dichloropropane, 1,4-dichlorobutane and 1,6-dichlorohexane,
    polyepoxides: polyethylene glycol diepoxides, ethylene glycol diglycidyl ether (EGDE), polyethylene glycol triepoxide,
    alkylepoxy halides: epichlorohydrin, bischlorohydrin ethers of alkylene glycols and polyalkylene glycol,
    alkylene carbonates: ethylene carbonate, propylene carbonate
    and bischloroformates: 2,2-dimethylpropylene bischloroformate.

3. A process according to claim 1, wherein the polyfunctional branching agent is water-soluble and selected from the group consisting of polyepoxides and alkylepoxy halides.

4. A process according to claim 1, wherein the polyfunctional branching agent is introduced at the rate of less than 2% by weight of the weight of cationic polymer.

5. A process according to claim 1, wherein the polyfunctional branching agent is introduced at the rate of 500 to 15000 ppm.

6. A process according to claim 1, wherein the base copolymer additionally comprises at least one unsaturated cationic ethylenic comonomer selected from the group consisting of monomers of a dialkylaminoalkyl methacrylamide, a diallylamine, a dialkyldiallylamine and their quaternary ammonium salts.

7. A process according to claim 1, wherein the base copolymer has been branched during or after its polymerization, in the presence of a branching agent selected from the group consisting of methylene bisacrylamide (MBA), polyallyl compounds, ethylene glycol diacrylate, polyethylene glycol dimethacrylate, diacrylamide, cyanomethylacrylate, vinyloxyethyl acrylate, vinyloxyethyl methacrylate, formaldehyde, glyoxal, glycidyl ether compounds, and epoxy compounds.

8. Cationic copolymer produced according to the process of claim 1, wherein the copolymer has a cationic charge density higher than 3 meq/g.

9. Method for fabricating a sheet of paper or cardboard, wherein, before formation of said sheet from a fibrous suspension, the cationic copolymer according to claim 1 is added to the fibrous suspension.

10. Method according to claim 9, wherein the cationic copolymer is reduced into the suspension at the rate of 500 g/to 2 kg per metric ton of slurry.

11. Method according to claim 9, wherein the cationic copolymer is introduced into the suspension at the rate of between 800 g and 1.5 kg per metric ton of slurry.

12. Cationic copolymer produced according to the process of claim 1, wherein the copolymer has an intrinsic viscosity higher than 0.8 dl/g.

13. Cationic copolymer produced according to the process of claim 1, wherein the copolymer has an intrinsic viscosity higher than 1 dl/g.

14. Cationic copolymer produced according to the process of claim 1, wherein the copolymer has a cationic charge density higher than 5 meq/g.

15. A process according to claim 1, wherein the base copolymer additionally comprises at least one nonionic monomer selected from the group consisting of N-vinyl acetamide, N-vinyl formamide, N-vinylpyrrolidone and vinyl acetate.

* * * * *